United States Patent [19]

Wu et al.

[11] Patent Number: 4,926,309
[45] Date of Patent: May 15, 1990

[54] ARTIFICIAL INTELLIGENCE FOR ADAPTIVE MACHINING CONTROL OF SURFACE FINISH

[75] Inventors: Charles L. Wu, Bloomfield Hills; Roger K. Haboush, Lathrup Village, both of Mich.

[73] Assignee: Ford Motor Company, Dearborn, Mich.

[21] Appl. No.: 242,664

[22] Filed: Sep. 12, 1988

[51] Int. Cl.$^5$ .................. G06F 15/46; G05B 13/04
[52] U.S. Cl. ........................ 364/149; 318/561; 318/571; 364/474.15; 364/474.17; 364/513
[58] Field of Search .................. 364/148-151, 364/156, 194, 474.15, 474.17, 551.02, 511, 164, 165; 318/561, 571; 73/105

[56] References Cited

U.S. PATENT DOCUMENTS

| | | | |
|---|---|---|---|
| 3,784,798 | 1/1974 | Beadle et al. | 364/474.15 |
| 4,031,368 | 6/1977 | Colding et al. | 364/474.17 X |
| 4,078,195 | 3/1978 | Mathias et al. | 364/474.15 X |
| 4,408,280 | 10/1983 | Bedini et al. | 364/474.15 |
| 4,547,847 | 10/1985 | Olig et al. | 364/474.15 X |
| 4,707,793 | 11/1987 | Anderson | 364/474.15 X |

OTHER PUBLICATIONS

"Implementation of Self-Tuning Regulators", by T. Fortescue, L. Kershenbaum, and B. Ydstie, *Automatica*, vol. 17, No. 5, (1981), pp. 831-835.

"Flank-Wear Model and Optimization of Machining Process and Its Control in Turning", by Y. Koren and J. Ben-Uri, *Proc. Instn. Mech. Engrs.*, vol. 187, No. 25, (1973), pp. 301-307.

"The Metal Cutting Optimal Control Problem—A State Space Formation", by E. Kannatey-Asibu, *Computer Applications in Manufacturing Systems*, ASME, 1981.

"A Microprocessor Based Adaptive Control of Machine Tools Using the Random Function Excursion Technique and Its Application to BTA Deep Hole Machining", by S. Chandrashekar, J. Frazao, T. Sankar, and H. Osman, *Robotics and Computer Integrated Manufacturing*, 1986.

"A Model-Based Approach to Adaptive Control Optimization in Milling", by Watanabe, *ASME Journal of Dynamic Systems, Measurement and Control*, vol. 108, Mar. 1986, pp. 56-64.

(List continued on next page.)

*Primary Examiner*—Joseph Ruggiero
*Attorney, Agent, or Firm*—Joseph W. Malleck; Roger L. May

[57] ABSTRACT

A method of using a mathematical model to adaptively control surface roughness when machining a series of workpieces or segments by: (a) linearizing a geometrical surface roughness model; (b) initializing said model essentially as a function of feed; and (c) subjecting the initialized model to computerized estimation based on roughness and feed values taken from the last machined workpiece, thereby to determine the largest allowable feed for attaining a desired surface roughness in subsequently machined workpieces or segments of the series. The mathematical model is an algorithm of the form $R = [1262.79]f^2/r$. The model is linearized and initialized to give the form $R = \beta_1 s_R f + \beta_2 R_{max}$ where R is the actual roughness and $R_{max}$ is desired roughness, f is actual feed, $\beta_1$ and $\beta_2$ are coefficients to be updated by estimation, and $s_R$ is a scale factor chosen to make the first term have the same order of magnitude as the second term. Computerized estimation is carried out by converting the above initialized linear model to vector matrix notation with provision for the estimated coefficients in the form $R_n = \theta^T x_n$, where $R_n$ is measured roughness, $x_n$ is a computed vector taken from measured feed, and $\theta$ is a vector to be estimated with "T" denoting the transpose of the vector. After inserting roughness and feed values into such vector model, taken from the last machined workpiece, the coefficients are recursively estimated by sequential regression analysis.

24 Claims, 12 Drawing Sheets

OTHER PUBLICATIONS

"Adaptive Control with Process Estimation", by Koren et al., *C.I.R.P. Annals*, vol. 30, No. 1, (1981), pp. 373-376.

"Experiments on Adaptive Constrained Control of a CNC Lathe", by R. Bedini and P. Pinotti, *ASME Journal of Engineering for Industry*, vol. 104, May 1982, pp. 139-150.

"Adaptive Control in Machining—A New Approach Based on the Physical Constraints of Tool Wear Mechanisms", by D. Yen and P. Wright, *ASME Journal of Engineering for Industry*, vol. 105, Feb. 1983, pp. 31-38.

"Variable Gain Adaptive Control Systems for Machine Tools", by A. Ulsoy, Y. Koren, and L. Lauderbaugh, *University of Michigan Technical Report No. UM-MEA-M-83-83, Oct., 1983*.

"Modeling, Sensing, and Control of Manufacturing Processes", by C. L. Wu, R. K. Harboush, D. R. Lymburner, and G. H. Smith, *Proceedings of the Winter Meeting of ASME*, Dec., 1986, pp. 189-204.

LEVEL ONE FLOWCHART　　　OVERALL PROGRAM

Block 3A — Convert linearized model to vector notation in the form $R_n = \Theta^T x_n$ Block 3B — After inserting measured values for $x_n$ into the vector notation, recursively estimate $\Theta$ by regression in analysis the equation $\Theta_n = \Theta_{n-1} + k_n \varepsilon_n$ where $k_n$ is an estimation gain vector which also may include a forgetting factor, $\varepsilon_n$ is a current prediction error, and $\Theta_{n-1}$ is the estimate of $\Theta$ computed for immediately prior workpiece Improve precision of recursive estimation by converting $k_n$ to a square root algorithm in the form: $k_n = g_n / (|v_n|^2 + \lambda_n)$ where $g_n = S_{n-1} v_n$
$v_n = S_{n-1}^T x_n$
$\lambda_n$ = discount factor

FIGURE 6

FIGURE 7                                         ©FORD MOTOR COMPANY, 1988

SOURCE CODE LISTING FOR FIGURES 5 AND 6

```
16600.   REM SUB: ADAPTIVE CONTROLLER
16610    GOSUB 21000
16670    REM TERMINATION TEST
16680    IF R7<=((1.+P2)*R4) THEN I1=-1
16690    I1=I1+1.
16700    IF I1=N1 THEN GOTO 17200
16710    REM PARAMETER ESTIMATION GAIN
16720    X1=X2*S8
16730    X3=Y1*X1+Y3*R4
16740    X4=Y2*X1+Y4*R4
16750    X5=X3*X3+X4*X4
16760    X6=Y1*X3+Y2*X4
16770    X7=Y3*X3+Y4*X4
16780    REM PREDICTION ERROR
16790    I2=0
16800    D8=D9
16810    T5=T3
16820    T6=T4
16830    E3=R7-T5*X1-T6*R4
16840    REM DISCOUNT FACTOR
16850    A1=(E3*E3/Z4+X5-1.)/2.
16860    IF A1<0. GOTO 16890
16870    D7=X5/SQR(A1*A1+X5)+A1)
16880    GOTO 16910
16890    D7=SQR(A1*A1+X5)-A1
16900    REM ESTIMATED STANDARD ERROR
16910    D9=D7*D8+1.
16920    Y5=SQR(Z4/D9)
16930    REM ESTIMATED PARAMETERS
16940    T3=T5+E3*X6/(D7+X5)
16950    T4=T6+E3*X7/(D7+X5)
16960    REM TEST PARAMETER FEASIBILITY
16970    Q2=(1.-T4)*R4-Z6*Y5
16980    IF ((T3>0.).AND.(Q2>0.)) THEN GOTO 17020
16990    I2=1
17000    E3=E3/2.
17010    GOTO 16850
17020    IF (I2=0) THEN GOTO 17030
17025    PRINT "TOOL WEAROUT AT PIECE #",1 : GOSUB 4000
17030    REM SQUARE ROOT OF ADAPTATION GAIN
17040    Q3=SQR(D7)
17050    A1=D7+X5+SQR(D7*(D7+X5))
17060    Y1=(Y1-X6*X3/A1)/Q3
17070    Y2=(Y2-X6*X4/A1)/Q3
17080    Y3=(Y3-X7*X3/A1)/Q3
17090    Y4=(Y4-X7*X4/A1)/Q3
17100    REM CONTROLLED FEED
17110    Y6=Q2/(T3*X2)
17140    IF Y6>=S8-D5 THEN Y7=Y6 ELSE Y7=S8-D5
17150    IF Z7>=Y7-D5 THEN Y7=Z7
17160    IF Y7<=S8+D5 THEN S8=Y7 ELSE S8=S8+D5
17170    IF Z8<=S8 THEN S8=Z8
17172    V(2)=INT(S8*266.667) : IF V(2)>120 THEN V(2)=120
17175    PRINT "THE FEED FOR THE NEXT PART IS", USING
         (#.####),S8
17180    RETURN
```

FIGURE 14A

| Workpiece Number $n$ | Forgetting Factor $\lambda_n$ | Standard Deviation $\sigma_n$ | Estimated Parameters $\beta_{1n}$ | Estimated Parameters $\beta_{2n}$ | Desired Feed $f_R$ | Controlled Feed $f_n$ | Measured Roughness $R_n$ |
|---|---|---|---|---|---|---|---|
| 1  | 0.0000 | 10.0 | 2.0000e+00 | -1.0000e+00 | 1.9420e-01 | 0.1778 | 57.0 |
| 2  | 0.9914 | 10.0 | 2.0654e+00 | -9.3461e-01 | 1.8316e-01 | 0.1832 | 53.0 |
| 3  | 0.7869 | 7.5  | 1.9975e+00 | -9.4334e-01 | 1.9016e-01 | 0.1902 | 48.0 |
| 4  | 0.4216 | 7.6  | 1.7437e+00 | -8.1469e-01 | 2.0471e-01 | 0.2047 | 51.0 |
| 5  | 0.6751 | 6.8  | 1.3252e+00 | -4.3997e-01 | 2.1909e-01 | 0.2191 | 47.0 |
| 6  | 0.5064 | 6.9  | 5.1464e-01 | 3.7585e-01  | 2.8231e-01 | 0.2572 | 60.0 |
| 7  | 0.9737 | 5.7  | 6.9277e-01 | 1.7660e-01  | 2.6086e-01 | 0.2609 | 65.0 |
| 8  | 0.8773 | 5.2  | 8.4351e-01 | 6.0632e-03  | 2.5019e-01 | 0.2502 | 61.0 |
| 9  | 0.9927 | 4.6  | 8.5723e-01 | -7.9358e-03 | 2.4909e-01 | 0.2491 | 64.0 |
| 10 | 0.8765 | 4.4  | 9.0163e-01 | -5.1985e-02 | 2.4551e-01 | 0.2455 | 69.0 |
| 11 | 0.4482 | 5.5  | 9.9880e-01 | -1.2913e-01 | 2.3536e-01 | 0.2354 | 63.0 |
| 12 | 0.9334 | 5.0  | 9.6549e-01 | -6.9518e-02 | 2.3250e-01 | 0.2325 | 63.0 |
| 13 | 0.9310 | 4.6  | 9.1994e-01 | 3.9832e-03  | 2.2981e-01 | 0.2298 | 59.0 |
| 14 | 0.9921 | 4.2  | 9.3779e-01 | -2.3245e-02 | 2.3059e-01 | 0.2306 | 63.0 |
| 15 | 0.9261 | 4.0  | 8.9572e-01 | 4.1980e-02  | 2.2848e-01 | 0.2285 | 60.0 |
| 16 | 1.0000 | 3.7  | 8.9572e-01 | 4.1980e-02  | 2.2848e-01 | 0.2285 | 60.0 |
| 17 | 1.0000 | 3.5  | 8.9572e-01 | 4.1980e-02  | 2.2848e-01 | 0.2285 | 59.0 |
| 18 | 0.9913 | 3.3  | 9.0820e-01 | 2.3442e-02  | 2.2897e-01 | 0.2290 | 59.0 |
| 19 | 0.9911 | 3.1  | 9.1830e-01 | 8.2529e-03  | 2.2939e-01 | 0.2294 | 60.0 |
| 20 | 1.0000 | 3.0  | 9.1830e-01 | 8.2592e-03  | 2.2939e-01 | 0.2294 | 59.0 |
| 21 | 0.9909 | 2.9  | 9.2579e-01 | -3.1906e-03 | 2.2973e-01 | 0.2297 | 60.0 |
| 22 | 1.0000 | 2.8  | 9.2579e-01 | -3.1906e-03 | 2.2973e-01 | 0.2297 | 59.0 |
| 23 | 0.9908 | 2.7  | 9.3149e-01 | -1.2048e-02 | 2.3002e-01 | 0.2300 | 59.0 |
| 24 | 0.9907 | 2.6  | 9.3616e-01 | -1.9483e-02 | 2.3028e-01 | 0.2303 | 61.0 |
| 25 | 0.9907 | 2.5  | 9.3238e-01 | -1.3293e-02 | 2.3003e-01 | 0.2300 | 59.0 |
| 26 | 0.9906 | 2.5  | 9.3656e-01 | -1.9931e-02 | 2.3027e-01 | 0.2303 | 61.0 |
| 27 | 0.9906 | 2.4  | 9.3317e-01 | -1.4371e-02 | 2.3004e-01 | 0.2300 | 60.0 |
| 28 | 1.000  | 2.3  | 9.3317e-01 | -1.4371e-02 | 2.3004e-01 | 0.2300 | 59.0 |
| 29 | 0.9905 | 2.3  | 9.3674e-01 | -2.0064e-02 | 2.3025e-01 | 0.2302 | 59.0 |

FIGURE 14B

| Workpiece Number $n$ | Forgetting Factor $\lambda_n$ | Standard Deviation $\sigma_n$ | Estimated Parameters $\beta_{1n}$ | $\beta_{2n}$ | Desired Feed $f_R$ | Controlled Feed $f_n$ | Measured Roughness $R_n$ |
|---|---|---|---|---|---|---|---|
| 30 | 0.9905 | 2.2 | 9.3967e-01 | -2.4863e-02 | 2.3044e-01 | 0.2304 | 60.0 |
| 31 | 1.0000 | 2.2 | 9.3967e-01 | -2.4863e-02 | 2.3044e-01 | 0.2304 | 60.0 |
| 32 | 1.0000 | 2.1 | 9.3967e-01 | -2.4863e-02 | 2.3044e-01 | 0.2304 | 59.0 |
| 33 | 0.9904 | 2.1 | 9.4179e-01 | -2.8495e-02 | 2.3060e-01 | 0.2306 | 55.0 |
| 34 | 0.7637 | 2.3 | 9.5219e-01 | -4.7423e-02 | 2.3162e-01 | 0.2316 | 57.0 |
| 35 | 0.9151 | 2.4 | 9.4775e-01 | -4.4982e-02 | 2.3225e-01 | 0.2322 | 54.0 |
| 36 | 0.6684 | 2.8 | 9.1579e-01 | -1.2635e-02 | 2.3407e-01 | 0.2341 | 56.0 |
| 37 | 0.8552 | 2.9 | 8.4953e-01 | 6.7051e-02 | 2.3565e-01 | 0.2357 | 58.0 |
| 38 | 0.9642 | 2.8 | 7.9970e-01 | 1.2889e-01 | 2.3659e-01 | 0.2366 | 59.0 |
| 39 | 0.9911 | 2.7 | 7.7174e-01 | 1.6393e-01 | 2.3708e-01 | 0.2371 | 54.0 |
| 40 | 0.6920 | 3.1 | 5.4085e-01 | 4.5457e-01 | 2.4275e-01 | 0.2428 | 62.0 |
| 41 | 0.9705 | 3.0 | 6.7444e-01 | 2.8265e-01 | 2.3999e-01 | 0.2400 | 58.0 |
| 42 | 0.9661 | 2.9 | 5.9269e-01 | 3.8691e-01 | 2.4182e-01 | 0.2418 | 56.0 |
| 43 | 0.8702 | 3.0 | 3.9252e-01 | 6.4415e-01 | 2.4861e-01 | 0.2486 | 61.0 |
| 44 | 0.9932 | 2.9 | 4.5976e-01 | 5.5655e-01 | 2.4613e-01 | 0.2461 | 60.0 |
| 45 | 1.0002 | 2.8 | 4.5976e-01 | 5.5655e-01 | 2.4613e-01 | 0.2461 | 59.0 |
| 46 | 0.9916 | 2.7 | 4.2290e-01 | 6.0435e-01 | 2.4748e-01 | 0.2475 | 65.0 |
| 47 | 0.7986 | 2.9 | 6.3777e-01 | 3.2461e-01 | 2.4209e-01 | 0.2421 | 62.0 |
| 48 | 0.9638 | 2.8 | 6.7135e-01 | 2.8269e-01 | 2.4109e-01 | 0.2411 | 47.0 |
| 49 | 0.0995 | 6.6 | -1.6566e-01 | 1.2969e+00 | 2.4109e-01 | 0.2411 | 45.0 |
| 50 | 0.5641 | 6.6 | -7.2298e-01 | 1.9722e+00 | 2.4109e-01 | 0.2411 | 42.0 |
| 51 | 0.6369 | 6.4 | -1.1745e+00 | 2.5193e+00 | 2.4109e-01 | 0.2411 | 44.0 |
| 52 | 0.9527 | 5.5 | -1.2837e+00 | 2.6515e+00 | 2.4109e-01 | 0.2411 | 34.0 |
| 53 | 0.3030 | 7.1 | -2.0989e+00 | 3.6393e+00 | 2.4109e-01 | 0.2411 | 91.0 |
| 54 | 0.0195 | 9.8 | 4.6793e+00 | -4.5737e+00 | 2.1912e-01 | 0.2191 | 55.0 |
| 55 | 0.9999 | 7.0 | 5.4835e+00 | -5.6641e+00 | 2.2234e-01 | 0.2223 | 57.0 |
| 56 | 0.9497 | 5.8 | 5.6859e+00 | -5.9434e+00 | 2.2316e-01 | 0.2232 | 55.0 |
| 57 | 0.8327 | 5.4 | 5.9144e+00 | -6.2632e+00 | 2.2415e-01 | 0.2241 | 57.0 |
| 58 | 0.9324 | 4.9 | 5.9901e+00 | -6.3735e+00 | 2.2459e-01 | 0.2246 | 58.0 |

ARTIFICIAL INTELLIGENCE FOR ADAPTIVE MACHINING CONTROL OF SURFACE FINISH

BACKGROUND OF THE INVENTION

1. Technical Field

This invention relates both to the art of machining and to the art of adaptive process control, and, more particularly, both to the art of finish-machining and the art of computer controlled adaptive processing.

2. Description of the Prior Art

The degree of surface roughness on machined parts is one of the most widely misunderstood and incorrectly specified aspects in part design. Reliability and optimum performance of the machined part are the primary reasons why selection of the proper machined surface is important. Surface roughness affects not only how a part fits and wears, but also how it may transmit heat, distribute a lubricant, accept a coating, or reflect light. Such part cannot possess the selected quality unless the surface roughness is controlled to be substantially the same on all the machined parts or segments. Without control, surface roughness will vary from part to part in a continuing machining process as a result of inherent variations in tool wear, tool composition, workpiece composition, and microflexing of the tool-holder to workpiece relationship; this will be true even though machining parameters such as feed, cut, and speed are kept constant.

Adaptive control of surface roughness would make it possible to achieve the benefits of precise specification of surface finish by assuring a substantially constant surface roughness throughout all the segments or parts of a given finish-machining operation. Adaptive control is used herein in a conventional manner to mean changing one or more of such machining parameters to influence surface roughness and maintain it at a desired level.

However, except for the activities of the inventors herein, adaptive control of surface roughness has not been undertaken by the prior art. Commerical machining operations today usually maintain the feed constant and adjust it only after the operation is stopped or after the machining run is complete, all in response to an off-line measurement. The use of the largest constant feasible depth of cut and the largest feed compatible with power and surface finish constraints is standard practice. Assuming adequate power is available, the surface finish desired determines the largest allowable constant feed. The constant feed is usually set conservatively low to ensure that the maximum allowable surface finish will not be exceeded as the tool wears. This, however, leads to poor productivity.

Adaptive controls were first used in the chemical industry to maintain a physical parameter at some desired level. Algorithms or computer models have been investigated to relate a selected parameter, such as pressure, to other influences that affect it such as temperature and reaction rate variables. An example is set forth in "Implementation of Self-Tuning Regulators", by T. Fortescue, L. Kershenbaum, and B. Ydstie, *Automatica*, Volume 17, No. 5 (1981), pp. 831–835. Such investigation worked with high order equations to devise dynamic math models that would accommodate a fast rate of data generation from the application. Estimates of the selected parameter were made on-line by recursive least squares estimation techniques, and as the estimates converged, control was achieved. Mathematical factors were inserted to keep the estimation techniques from imposing unstable control. Unfortunately, such computer model for the chemical industry involved too many variables and was much too complex to be used for straightforward control of surface roughness in a machining application. The question remains whether roughness can be mathematically related to essentially one variable: feed.

To answer this question, one must look to known adaptive controls in the machining art to see if a solution has been provided. Adaptive controls have been proposed for controlling aspects not directly related to surface roughness. Such controls are essentially of two types. One type is to optimize the least cost or time for machining by sensing a changing machining condition (i.e., tool wear) which cannot be totally controlled, and thence to use this information to adjust other machining parameters (i.e., speed and feed) to achieve cost or time optimization. When using feed and velocity, the feed and speed may be adjusted to obtain the most economical tool life.

References which disclose this first type of optimization control are: "Flank-Wear Model And Optimization Of Machining Process And its Control in Turning", by Y. Koren and J. Ben-Uri, *Proc. Instn. Mech. Engrs.*, Volume 187, No. 25 (1973), pp. 301–307; "The Metal Cutting Optimal Control Problem—State Space Formulation", by E. Kannatey-Asibu, *Computer Applications in Manufacturing Systems*, ASME, 1981; "A Microprocessor Based Adaptive Control Of Machine Tools Using The Random Function Excursion Technique And Its Application to BTA Deep Hole Machining", by S. Chandrashekar, J. Frazao, T. Sankar, and H. Osman, *Robotics and Computer Integrated Manufacturing*, 1986; and "A Model-Based Approach To Adaptive Control Optimization In Milling", by T. Watanabe, *ASME Journal of Dynamic Systems, Measurement and Control*, Volume 108, March 1986, pp. 56–64.

The other type of adaptive machining control is to sense, in real time, a controllable machining condition (i.e., power consumption which can be controlled) and thence to use such sensed condition to change other machining conditions (i.e., speed and feed) to ensure that the first condition (power consumption) is constrained to be below a certain maximum level. References which disclose this type of constraint control are: "Adaptive Control With Process Estimation", by Koren et al, *C.I.R.P. Annals*, Volume 30, No. 1 (1981), pp. 373–376; "Experiments on Adaptive Constrained Control of a CNC Lathe", by R. Bedini and P. Pinotti, *ASME Journal of Engineering for Industry*, Volume 104, May 1982, pp. 139–150; "Adaptive Control In Machining-A New Approach Based On The Physical Constraints Of Tool Wear Mechanisms", by D. Yen and P. Wright, *ASME Journal of Engineering for Industry*, Volume 105, February 1983, pp. 31–38; and "Variable Gain Adaptive Control Systems For Machine Tools", by A. Ulsoy, Y. Koren, and L. Lauderbaugh, *University of Michigan Technical Report* No. UM-MEAM-83-18, October, 1983.

Optimization machining control, the first type, has not been used in the commercial machine tool industry because it requires on-line measurement of tool wear which has not yet been developed technically or economically to make it feasible. Constraint machining control, the second type, has been used only in commercial roughing operations; it is disadvantageous because it requires (i) the use of several expensive sensors to measure cutting forces, torque, or temperatures during machining, and (ii) extensive off-line acquisition of data to derive comparative computer models to establish maximum levels, all of which demand undue and expensive experimentation.

But, more importantly, both types of such adaptive controls in the machining arts are not designed to maximize workpiece quality, such as surface finish. None of such controls have entertained the idea of relating surface roughness to essentially only feed in a static relationship that reduces data gathering.

Accordingly, it is a primary object of this invention to utilize a mathematical model in such a way that it results in adjusting the machining feed to maintain a desired surface roughness for each machined part or segment in a series, despite tool wear, variations in tool material and geometry, and variability in workpiece composition. This will lead to improved and more uniform machining quality.

Another object of this invention is to provide such artificial intelligence for adaptively controlling feed which provides for machining workpieces at higher feeds and hence shorter cutting times than obtainable with conventional metal cutting operations. By automatically seeking higher feeds consistent with targeted surface finish and cutting tool conditions, increased productivity will indirectly result while maintaining consistent part quality.

Still another object of this invention is to provide an algorithm based on a simple static geometrical relationship that not only improves the predictability of a finish-machining process, but also permits the detection of a tool worn beyond its useful life; the latter detection is based on the rate of change of a specific coefficient of such algorithm. The algorithm would permit the controller to be self-learning and use the measured surface roughness to predict the condition of the cutting tool.

SUMMARY OF THE INVENTION

The invention is a method of using a mathematical model to adaptively control surface roughness when machining a series of workpieces or segments. The method essentially comprises: (a) linearizing a geometrical model of surface roughness essentially as a function of feed; (b) initializing such model; and (c) subjecting the initialized model to computerized estimation based on roughness and feed values taken from the last machined workpiece, thereby to determine the largest allowable feed for attaining a desired surface roughness in subsequently machined workpieces or segments of the series. The mathematical model is an algorithm derived by imposing the centerline average method of measuring roughness onto a geometrical surface model of circular segments, solving for a portion of a leg of a triangle described within one of such segments by use of Pythagoras' Theorem. By using small angle approximations for chord angles of such triangles, the result is the following revised static model form:

$$R = [1262.79] \frac{f^2 \text{ (feed)}}{r \text{ (tool nose radius)}}$$

where R is roughness in microinches.

This model $R = 1262.79\ f^2/r$ is linearized by use of first order Taylor series expansion techniques to give the approximate relationship $R \approx R(f_o) + [dR(f_o)/df](f - f_o)$. The relationship is initialized by setting R equal to the desired maximum roughness and solving for feed ($f_o$). The initial feed estimate will thus be $0.0281406 \sqrt{rR_{max}}$. If $f_o$ is substituted into the expanded relationship and the latter scaled, the following linear model is provided:

$$R = \beta_1 s_R f + \beta_2 R_{max}$$

where R is the actual roughness and $R_{max}$ is desired roughness, f is actual feed, $\beta_1$ and $\beta_2$ are coefficients to be updated by estimation, and $s_R$ is a scale factor chosen to make the first term have the same order of magnitude as the second term.

Computerized estimation is carried out by converting the above initialized linear model to vector-matrix notation with provision for the estimated coefficients in the form:

$$R_n = \theta^T x_n$$

where $R_n$ is measured roughness, $\theta$ is the vector to be estimated with "T" denoting the transpose of the vector, and $x_n$ is the computed vector taken from measured feed.

After inserting roughness and feed values into such vector model, taken from the last machined workpiece, recursive estimation of the coefficients is carried out by sequential regression analysis. Square root regression may be used to increase the precision of such calculations.

The estimated vector $\theta_n$ is improved in accuracy by incorporating a prediction error term $\epsilon_n$ and a forgetting factor $\mu_n$. The forgetting factor is chosen to minimize and keep constant the discounted sum of squared model errors $\Sigma_n$ preferably equal to that which is determined experimentally to be a compromise between small and large changes in $\theta_n$.

SUMMARY OF THE DRAWINGS

FIG. 6 is a third level flow diagram further depicting the step of computing an updated feed in FIG. 5;

FIG. 7 is a computer source code useful in carrying out the steps of FIGS. 5 and 6;

DETAILED DESCRIPTION AND BEST MODE

Figure 1:
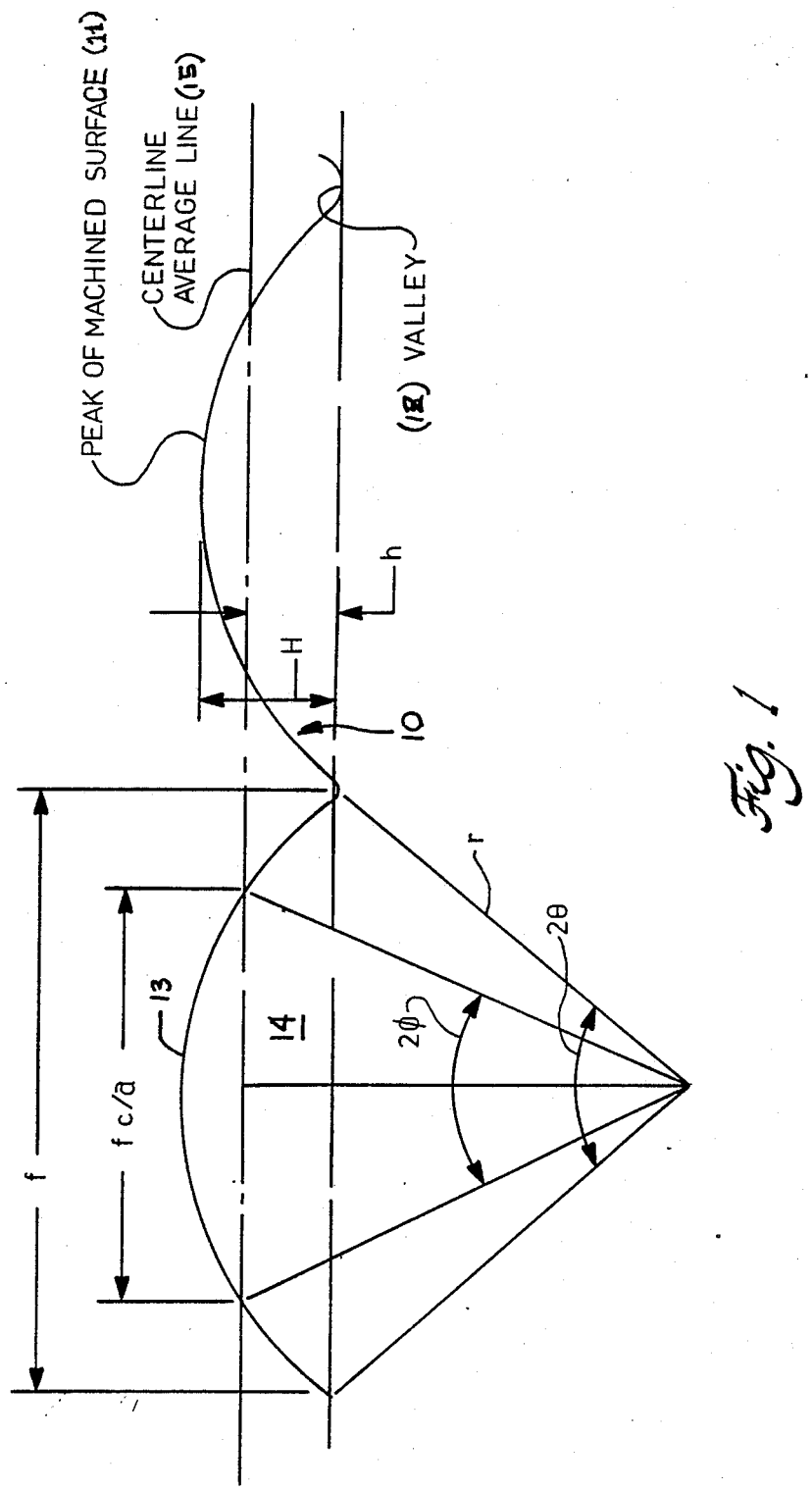
FIG. 1 is a schematic illustration of the geometric relationship used to relate surface roughness to machining feed.

A basic aspect of this invention is the formulation of a simple static geometric algorithm which accurately relates surface roughness to feed of the machine tool. As shown in FIG. 1, a cutting tool describes a surface 10 as it moves along its machining path; the surface 10 varies from peak 11 to valley 12. Taking one arc 13 of such surface, a relationship has been derived from the assumed circular segment 14 having a chord length which is feed f and having a radius which is the tool nose radius r. The height H of such segment 14 is calculated from Pythagoras' Theorem to be approximately equal to $f^2/8r$. Pythagorus' Theorem states that: $(r-H)^2+(f/2)^2=r^2$. However, it is the height h of the centerline average line 15 that is of interest to this method. Using small angle approximations for the angles $2\phi$ and $2\theta$ in FIG. 1, the height h for the centerline average line produces an equation where the centerline average roughness R in microinches is:

$$R = 1262.7933 \, f^2/r \text{ (static math model)}$$

Note that this static math model derived from geometry does not consider parameters such as the cutting tool rake angle, cutting speed, depth of cut, and side cutting edge angle. There is experimental evidence that shows depth of cut has little effect on the surface texture over the range one would call "finishing cuts"; the side cutting edge angle is irrelevant since it is only the extremity of the radiused part of the tool which has any effect on the surface texture; rake angle is not a significant factor since it is selected largely to give a suitable chip formation for the material being machined; and cutting speed is assumed to be constant throughout the machining operation and therefore will have little effect on the geometrical nature of roughness.

Using such static math model, the method aspect of this invention adaptively controls surface roughness in machining a series of workpieces or segments by: (a) linearizing a geometrical model of surface roughness essentially as a function of feed; (b) initializing such model; and (c) subjecting the initialized model to computerized estimation based on roughness and feed values taken from the last machined workpiece, thereby to determine the largest allowable feed for attaining a desired surface roughness in subsequently machined workpieces or segments of the series.

Figure 2:
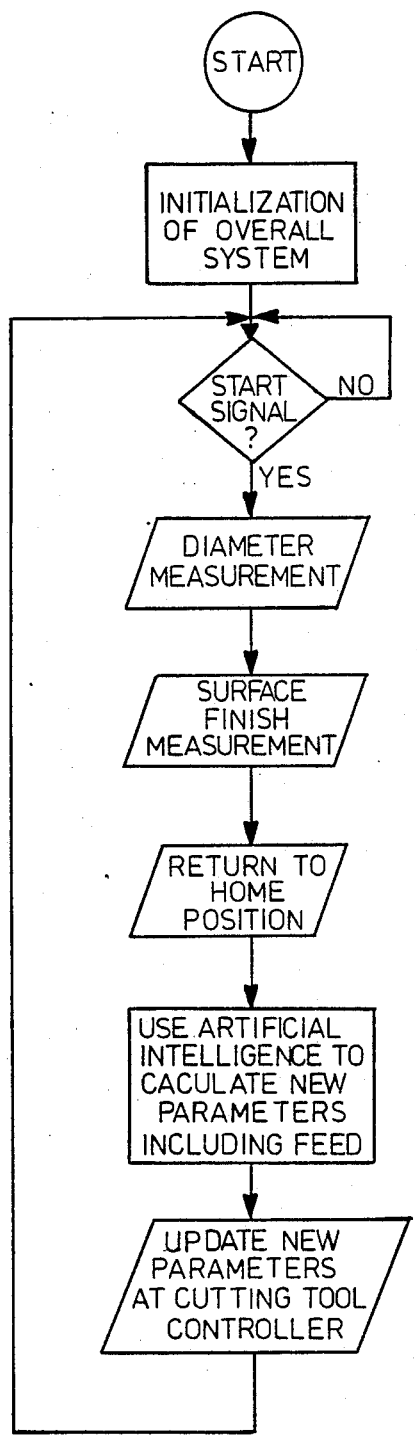
FIG. 2 is an overall system flow diagram which in part incorporates the method of using artificial intelligence to adaptively control feed for improving the surface finish of a series of machined workpieces or segments.

Software for a surface roughness controlling system or machine incorporating the above method as a subset thereof is shown in FIG. 2; such overall system includes initialization, physical gauging movements, as well as carrying out artificial intelligence calculations, part of which form this invention. The hardware and overall system for such a roughness controller is disclosed in a publication authored in part by the coinventors of this invention: "Modeling, Sensing, and Control of Manufacturing Processes", by C. L. Wu, R. K. Haboush, D. R. Lymburner, and G. H. Smith, *Proceedings of the Winter Meeting of ASME*, December, 1986, pages 189-204. This publication introduces the system approach and compares results using such system with the artificial intelligence of this invention without disclosing such intelligence. The teaching of this reference is incorporated herein.

Figure 3:
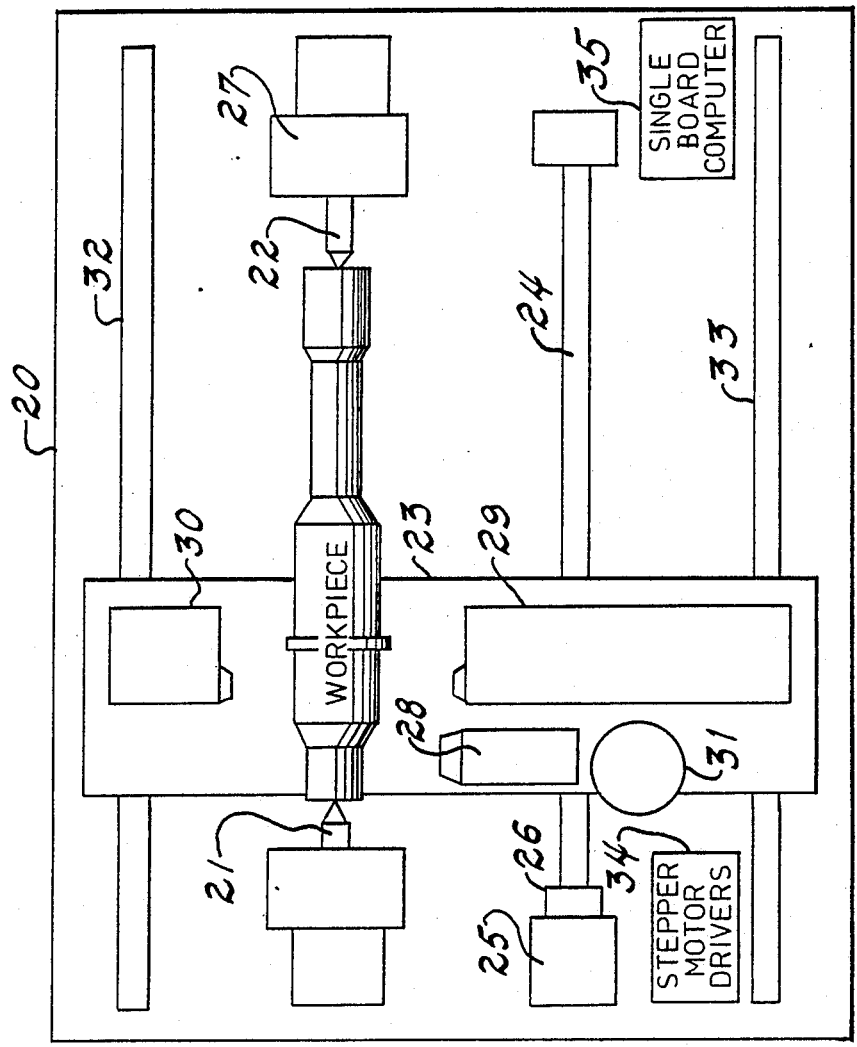
FIG. 3 is a schematic layout of hardware components comprising a gauging station for the overall system.

An example of a gauging platform for carrying out the gauging movements is shown in FIG. 3. The platform comprises a base plate 20, head stock 21 with a fixed center, tail stock 22 with a pneumatically actuated center, a traversing gauge table 23, a lead screw 24, and a stepper motor 25. The gauge head 23 is mounted on cylindrical bearings which allow the head to move on rails 32, 33 from one end of the platform 20 to the other. The lead screw 24 is attached to the gauge head 23 by means of a recirculating ball bearing arrangement and bearing mount. The gauge table carries a surface finish gauge 28 and a laser diameter gauge comprised of parts 29 and 30. Attached to the end of the lead screw for the gauge head is the flexible coupling 26 which connects the lead screw to the stepper motor 25; this stepper motor and lead screw arrangement has an axial positioning resolution of 0.002 inches. Due to the fine positional resolution, it is possible to run the stepper motor in an open-loop arrangement (no positional feedback). The adjustable tail stock center may be controlled by an electrically activated pneumatic valve 27 so that a device such as a computer can initiate clamping of the part to be gauged.

The surface finish gauge may be a Surtronic-10 diamond stylus profilometer; this instrument has a drive motor 31 to traverse the stylus into contact with the workpiece. Analog and digital signal processing electronics convert the stylus signal into a numerical roughness value and display. The profilometer has a measurement range of 1-1600 microinches on the roughness scale. To make a surface roughness measurement, the stylus of the unit is placed in contact with the part and the start signal is activated. The stylus is drawn across the part for a distance of about 0.19 inches by movement of the gauge head via stepper motor driver 34. Stepper motor 31 is used to drive the stylus into contact with the part when the roughness measurements are to be made. The profilometer requires a computer interface to link the profilometer with a microprocessor (such as single board computer 35). Such interfaces are readily known to those skilled in the art as well as an interface for the NC controller to the microprocessor (see 40 and 41 in FIG. 4).

Returning to FIG. 2, initialization of the overall software system, is carried out by a routine to initialize all of the I/O lines, the profilometer 28, the separate motors, and the adaptive controller or microprocessor. Current values of feed may be read from the NC processor to be used as starting values for the control algorithms.

The overall software system next looks for a signal to tell it to start its cycle. This signal could be a digital input, such as a pushbutton in a manually operated system, or input from an electronic port when the system is under the control of another computer. After the start signal is received, a stepper motor drives the diameter gauging head 29 to the first diameter to gauge, obtains the diameter measurement, and feeds its value to the adaptive controller 35. This process is repeated until all of the desired diameters have been gauged. Such diameter measurements are useful to update machining offsets of the NC controller and are not of direct use to the method of this invention.

The roughness gauging head 28 is then driven by the stepper motor/lead screw arrangement to the point where surface finish can be measured. The stepper motor 31 on the gauge head translates the profilometer towards the part until it makes contact. A signal to start the profilometer measurement is given the controller, the profilometer measures the part, and the controller reads the surface value. The stepper motor/lead screw arrangement then drives the gauging head to the home position.

All of the data has now been gathered and the control algorithm can be performed according to the step labeled "Use Artificial Intelligence to Calculate New Parameters"; this stage of the software system represents the invention. The surface roughness value is the input to the adaptive feed algorithm and a feed value for the next part to be machined is calculated. The algorithm measures the machining process output after each workpiece (or after each segment of a stepped part) is machined. The feed for machining the next workpiece is then calculated. After this workpiece (or segment) is machined, the outputs are again measured and the feed calculated, etc.

Thus, the feed, while not varied during machining of a given workpiece (or segment), is adjusted between measurements to maintain a desired value of the surface roughness despite the effect of variations in process parameters, tool wear, depth of cut, and workpiece hardness. The feed used for the most recently machined workpiece is used as the independent variable in the roughness regression model. The feed for machining the next workpiece is chosen to maximize the metal removal rate, which is the product of feed, speed, and depth of cut. Since the latter two quantities are held fixed, maximizing the metal removal rate is equivalent to finding the largest allowable feed, subject to limitations on feed, available cutting power, feed rate, and surface roughness.

Figure 4:
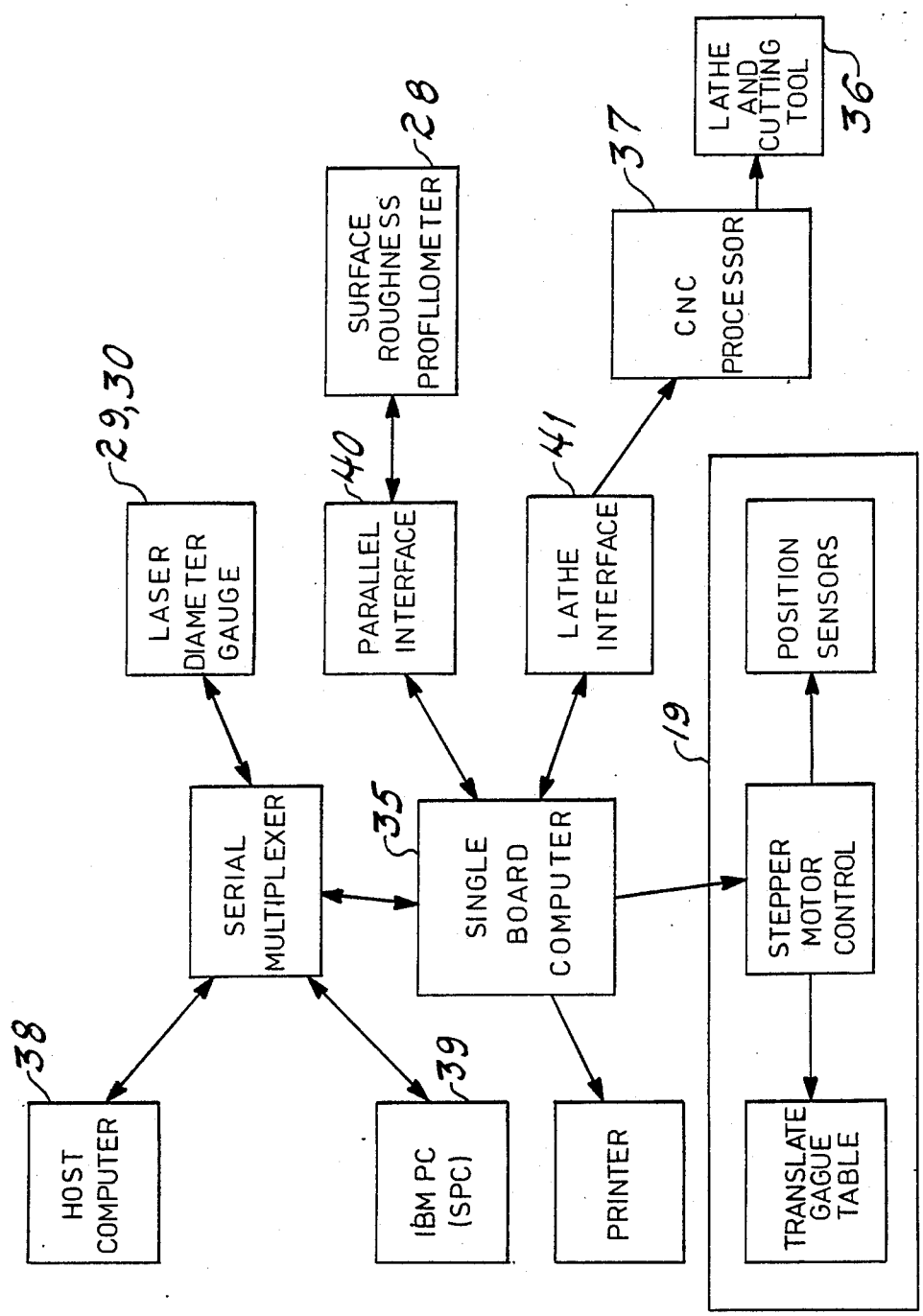
FIG. 4 is a block diagram illustrating electronic intercommunications between basic elements of the overall system.

An example of electronic hardware to carry out the commands of such overall software system is shown schematically in FIG. 4. A lathe 36 with a cutting tool is controlled by a numerically controlled processor 37 and a workpiece gauging assembly 19, both of which are interconnected by a microprocessor 35 (single board computer) backed up by a host computer 38. The microprocessor 35 may use an Intel 8052 option containing a BASIC interpreter resident in ROM on the microprocessor. The microprocessor may also provide utilities to call and execute user written assembly language routined by use of an IBM PC (see 39) and some powerful mathematical and I/O capabilities from the host computer 38. The microprocessor 35 may be configured with up to 32K bytes of ROM. Special commands may activate on-board EPROM programming circuitry that save data or program information on either a 264 or 27128 EPROM.

The interpreted BASIC language used by the microprocessor 35 provides extensive mathematical and logical operations; however, it is relatively slow (approximately one ms/instruction). The overall system of this invention need not be extremely fast as required in a real time controller. Thus, it is possible to program the majority of the software in BASIC. Only time critical tasks need be programmed in assembly language and called from the main program written in BASIC.

Software

Figure 5:
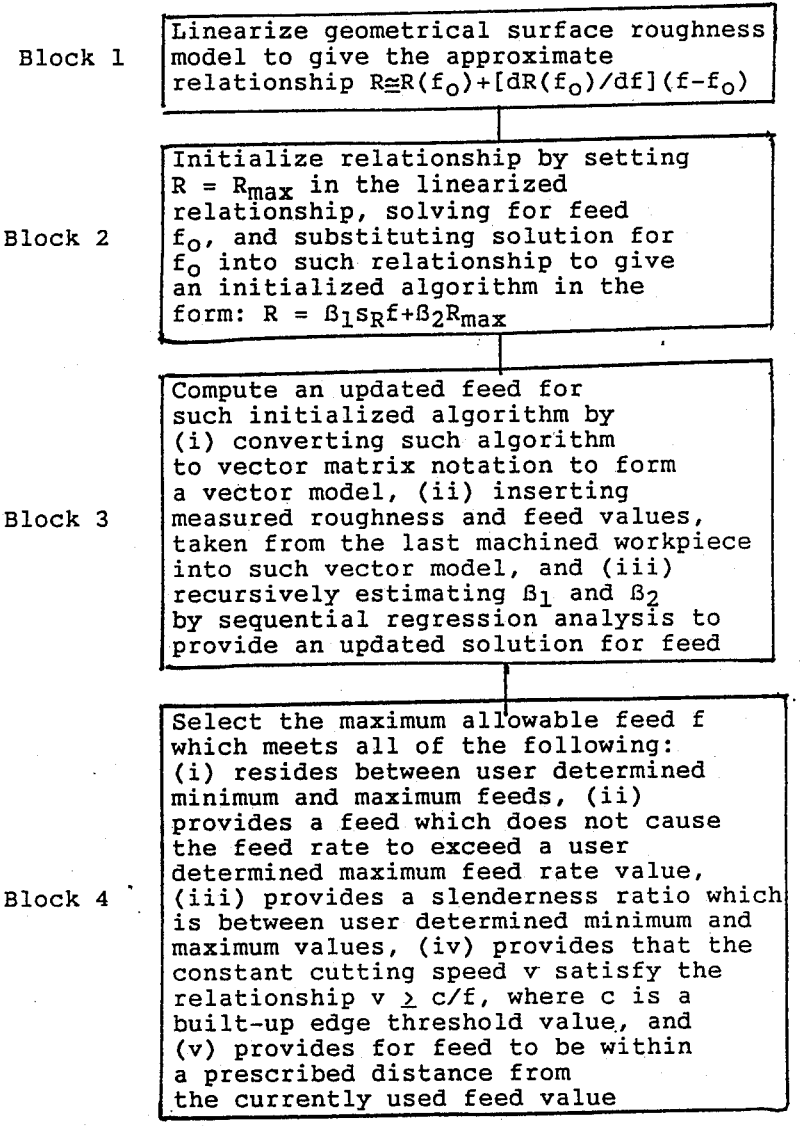
FIG. 5 is a second level flow chart further depicting the step of calculating new parameters set forth in FIG. 2.

The first step of the claimed method for calculating the new parameters, as illustrated in FIG. 5, comprises the first block. In this block, the geometrical surface roughness model $R = 1262.7933\, f^2/r$ is linearized using first order Taylor series expansion techniques to give the approximate relationship as follows:

$$R = \approx R(f_o) + [dR(f_o)/df](f - f_o)$$

The second step initializes such relationship by setting $R = R_{max}$, solving for feed $f_o$. This will take the form: $f_o = 0.0281406\, \sqrt{rR_{max}}$. $R_{max}$ is the desired value of maximum roughness. Substituting the expression of initial feed $f_o$ into this expanded approximated relationship gives the following linear model or algorithm:

$$R = 2(s_R f) - R_{max}$$

where $s_R$ is a scale factor (equal to $35.53804\, \sqrt{R_{max}/r}$) chosen to make the term $s_R f$ have the same order of magnitude as R, thereby to improve estimation accuracy, particularly through sequential regression analysis. An initialized linear static mathematical model, adapted with coefficients to permit the updating of the algorithm, takes the following form:

$$R = \beta_1 s_R f + \beta_2 R_{max}$$

where $\beta_1$ and $\beta_2$ are coefficients updated by estimation, such as through sequential regression algorithm techniques. The initial values of $\beta_1$ and $\beta_2$ are, respectively, 2 and minus 1 according to the original linear model.

The third step of the claimed process, represented as block 3 of the flow diagram in FIG. 5, essentially subjects the initialized algorithm to computerized estimation based upon roughness and feed values taken from the last machined workpiece, thereby to determine the largest allowable feed and to attain a desired surface roughness for subsequently machined workpieces or segments of the series. As depicted in FIG. 5, computing is carried out for an updated feed in such algorithm by (i) converting the linearized algorithm to vector matrix notation, (ii) inserting measured roughness and feed values taken from the last machined workpiece into such vector model, and (iii) recursively estimating $\beta_1$ and $\beta_2$ by sequential regression analysis to permit an updated solution for feed.

In more particularity, and as shown in FIG. 6, the third step of the claimed process comprises conversion to vector notation in the form $R_n = \theta^T x_n$ where $R_n$ is the measured roughness value, $x_n$ is a computed vector realized from measured feed, and $\theta$ is an unknown parameter vector whose value is estimated by an estimated vector $\theta_n$ given by the following recursive equation:

$$\theta_n = \theta_{n-1} + k_n \epsilon_n$$

where $k_n$ is an estimation gain vector. In standard sequential regression, $k_n$ is derived from the first of the following equations, and $\epsilon_n$ is a prediction error derived from the second of the following equations:

$$k_n = P_{n-1} x_n / (x_n^T P_{n-1} x_n + \lambda_n)$$

$$\epsilon_n = R_n - \theta_{n-1}^T x_n = R_n - \hat{}_n$$

where $$P_n = (I - k_n x_n^T) P_{n-1}/\lambda_n$$

$\hat{}_n$ is distinguished from $R_n$ by the fact that $\hat{}_n$ is the prediction of the measured roughness $R_n$, based on the most recent parameter estimate $\theta_{n-1}$.

After each new measurement of $x_n$ and $R_n$, an estimate $\theta_{n-1}$ of $\theta$ is updated by an amount proportional to the current prediction error $\epsilon_n$. The measurements of $x_n$ and $R_n$ are processed sequentially, and no matrix inversion is required to obtain the recursive estimate $\theta_n$ of $\theta$ after n measurements. The use of the prediction error $\epsilon_n$ is successively halved, if necessary, until feasible parameter estimates are obtained, thereby preventing large changes in the estimated coefficients $\beta_1$ and $\beta_2$.

To improve the precision of recursive estimation, the $k_n$ term may be converted to a square root algorithm in the form:

$$k_n = g_n/(|v_n|^2 + \lambda_n)$$

where $g_n = S_{n-1} v_n$, and $v_n = S_{n-1}^T x_n$, and $\lambda_n$ is discount factor. $S_n$ is a $2 \times 2$ matrix where $P_n = S_n S_n^T$. This is represented as an alternative block in FIG. 6. Use of the square root algorithm doubles the precision of the covariance matrix calculation and ensures that the matrix $P_n$ is always positive definite.

The matrix $S_n$ is updated by the following equation:

$$S_n = \{S_{n-1} - g_n v_n^T/[|v_n|^2 + \lambda_n + \sqrt{\lambda_n(|v_n|^2 + \lambda_n)}\,]\}/\sqrt{\lambda_n}$$

where the initial value $S_o$ is taken to be proportional to the identity matrix.

A different or improved variable discount or "forgetting" factor $\lambda_n$ is used in the sequential regression analysis herein to discount old data and respond to changes in the roughness model. After n measurements of the roughness have been made, the vector estimate $\theta_n$ is chosen to minimize the discounted sum of squared model errors $\Sigma_n$ given by:

$$\Sigma_n = \sum_{k=1}^{n} \lambda_n^{n-k} (y_k - \theta_n^T x_k)^2$$

Since $0 < \lambda_n < 1$, multiplying the kth squared model error in the above equation by $\lambda_n$ raised to the $n-k$ power has the effect of giving a greater weight to the more recent observations, thus allowing them to have a greater influence on the model coefficient estimates. The discount factor $\lambda_n$ is chosen to keep $\Sigma_n$ equal to some fixed value $\Sigma_o$ for every n, where $\Sigma_o$ is a user-specified value which is given theoretically by $\Sigma_o = M\sigma^2$ where M is the desired moving window length for the regression analysis and $\sigma$ is the standard deviation of the regression model error. Since, in practice, neither M nor $\sigma$ can be specified a priori, $\Sigma_o$ is not computed but is instead determined experimentally and chosen to provide an acceptable compromise between tracking of changes in regression model coefficients (small $\Sigma_o$) and smoothing of noisy measurements (large $\Sigma_o$).

It can be shown that $\Sigma_n$ is given recursively by:

$$\Sigma_n = \lambda_n [\Sigma_{n-1} + \epsilon_n^2/(\lambda_n + |v_n|^2)]$$

Replacing $\Sigma_n$ and $\Sigma_{n-1}$ in this equation by the experimentally determined value of $\Sigma_o$ and solving the resulting quadratic equation for $\lambda_n$ gives:

$$\lambda_n = \sqrt{|v_n|^2 + c_n} - c_n$$

where $$c_n = \frac{\epsilon_n^2/\Sigma_o + |v_n|^2 - 1}{2}$$

Feed Constraints

As an additional step, shown as the fourth block in FIG. 5, the controlled feed must further meet several user-imposed feed constraints. The feed itself may be restricted to a range $$f_{min} \leq f \leq f_{max}$$

where $f_{min}$ and $f_{max}$ are user-entered values for the minimum and maximum allowable feed, respectively, chosen to provide good chip control and limit cutting forces.

The feed rate may also be constrained to be below the maximum allowable value $F_{max}$ for the particular lathe being used. This leads to the inequality $$fN \leq F_{max}$$

where N denotes the spindle speed.

The slenderness ratio, which is the ratio of depth of cut to feed, may be restricted to lie between user-entered values $s_{min}$ and $s_{max}$ to avoid chatter. This leads to the inequalities $$s_{min} \leq d/f \leq s_{max}$$

To avoid built-up edge, the feed may be chosen so that the constant cutting speed v is always greater than a critical cutting speed which is inversely proportional to the feed, i.e.:

$$v \leq c_{bue}/f$$

where $c_{bue}$ is the constant of proportionality.

To avoid excessively large changes in feed from one measurement to the next, the feed may be also constrained to be no larger than a user-specified distance $\Delta$ away from the feed $f_p$ determined during the immediately preceding adjustment, i.e.:

$$|f - f_p| \leq \Delta$$

All of the above constraints on feed together are equivalent to a pair of inequalities $$f_l \leq f \leq f_u$$

where the lower and upper limits of feed $f_l$ and $f_u$ are given, respectively, by $$f_l = \text{maximum } (f_{min}, d/s_{max}, c_{bue}/v, f_p - \Delta)$$

and $$f_u = \text{minimum} (f_{max}, F_{max}/N, d/s_{min}, f_p + \Delta)$$

Thus, the roughness control feed $f_R$ is determined from the surface roughness regression model where $\beta_1$ and $\beta_2$ are replaced by their current estimates $\beta_{1n}$ and $\beta_{2n}$, respectively, obtained from the procedure described above. The feed $f_R$ is chosen to make the surface roughness predicted by the model equal to the desired value.

The desired roughness value is the maximum allowable surface roughness $R_{max}$ and can be diminished by a specified multiple $Z_R$ of the current estimation model error standard deviation $\sigma_n$ to reduce the probability of exceeding the roughness limit $R_{max}$:

$$f_R = [(1 - \beta_{2n})R_{max} - Z_R\sigma_n]/\beta_{1n}s_R$$

An estimate $\sigma_n$ of the model error standard deviation is given by $$\sigma_n = \sqrt{\Sigma_o/d_n}$$

where $d_n$, the discounted degrees of freedom, is given recursively by $$d_o = 0$$

$$d_n = \lambda_n d_{n-1} + 1$$

The control feed $f_n$ for machining the next workpiece is then taken to be the feed value which comes closest to $f_R$ while not exceeding any of the feed constraints listed previously.

The source code useful in carrying out blocks 3 and 4 of FIG. 5 is disclosed in the listing of FIG. 7.

Test Results

The adaptive feed control was tested using a series of actual cutting operations with a lathe. Two of such tests are presented herein to demonstrate operation of the adaptive control algorithm and evaluate its effectiveness in maintaining desired surface roughness. Each of the tests were made with a finish turning tool having the following tool geometry:

| | |
|---|---|
| back rake angle | −5° |
| side rake angle | −5° |
| end relief angle | 5° |
| side relief angle | 5° |
| end cutting edge angle | 5° |
| side cutting edge angle | −5° |
| nose radius | 0.79375 mm |

The workpiece material was SAE 4140 steel having a hardness of about BHN 200. The cutting speed and depth of the cut were kept constant throughout the test. The only controlled machining variable was feed. The cutting conditions were: cutting speed 182.88 m/min; depth of cut 1.270 mm; initial feed 0.1778 mm/rev; number of machining passes 4; workpiece diameter 43.18 mm; and workpiece length 33.02 mm.

Figure 8:
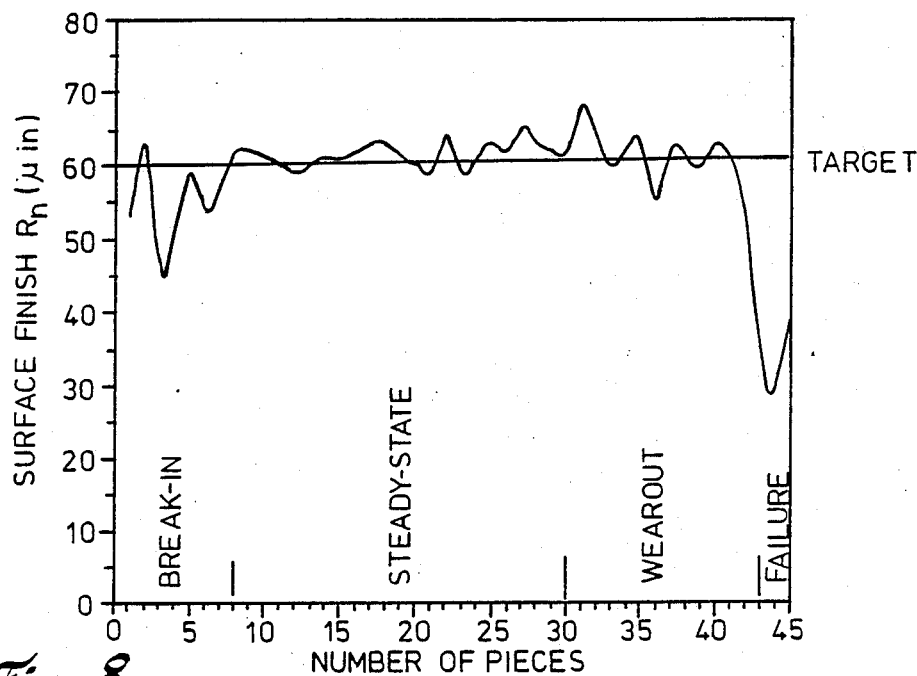
FIG. 8 is a graphical illustration depicting surface finish as a function of the number of pieces machined utilizing the method of this invention.

FIG. 8 shows the centerline average surface roughness in microinches plotted against the workpiece number. The desired centerline average roughness was 60 microinches. There appears to be four distinguishable regions of surface roughness behavior illustrated in this graphical presentation. First there is a break-in region in which roughness changes rapidly due to the formation of a groove on the tool flank below the main cutting edge. The adaptive control algorithm adjusts the initial feed by modifying the initial surface roughness model parameters to bring the measured roughness to its desired value. The second region is a steady-state region in which the groove wear stabilizes and the estimated model parameters are brought to their current values so that the measured surface roughness hovers about its desired value. The third is a wear-out region in which the tool flank wear becomes large enough to cause a sufficiently large increase in measured surface roughness so that the adaptive control algorithm must return it to the desired value. The fourth region is a brief terminal region in which the tool nose deteriorates enough to cause a drastic reduction in surface roughness to a point where control is impossible and the tool must be replaced.

Figure 9:
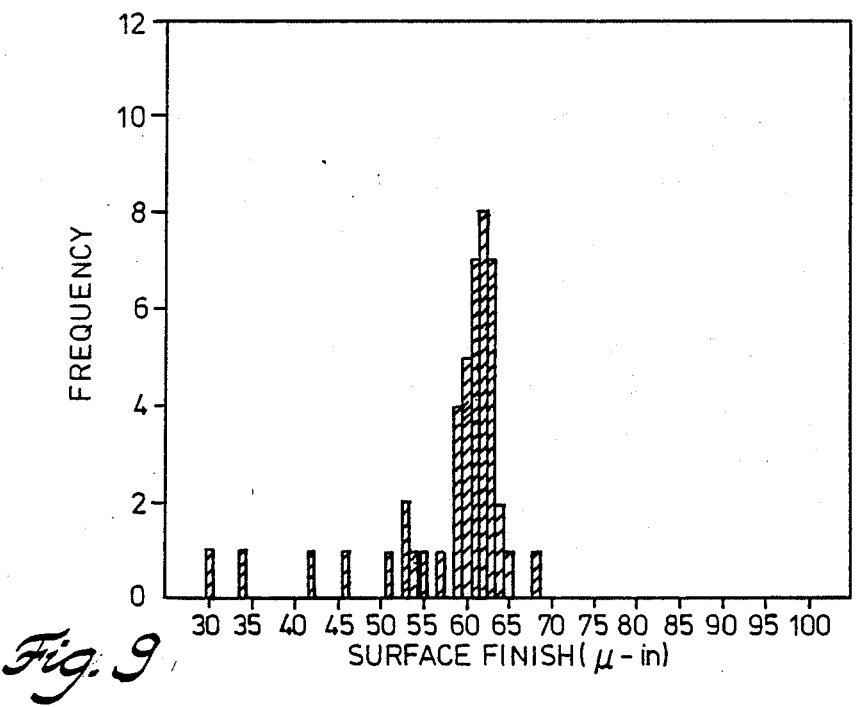
FIG. 9 is a graphical illustration presenting a surface finish histogram for the test results of FIG. 8.

Turning to FIG. 9, there is shown a histogram of the same surface roughness measurement as shown in FIG. 8. The majority of roughness values, corresponding to the steady-state and wear-out regions shown in FIG. 8, cluster tightly about the desired value of 60 microinches.

Figure 10:
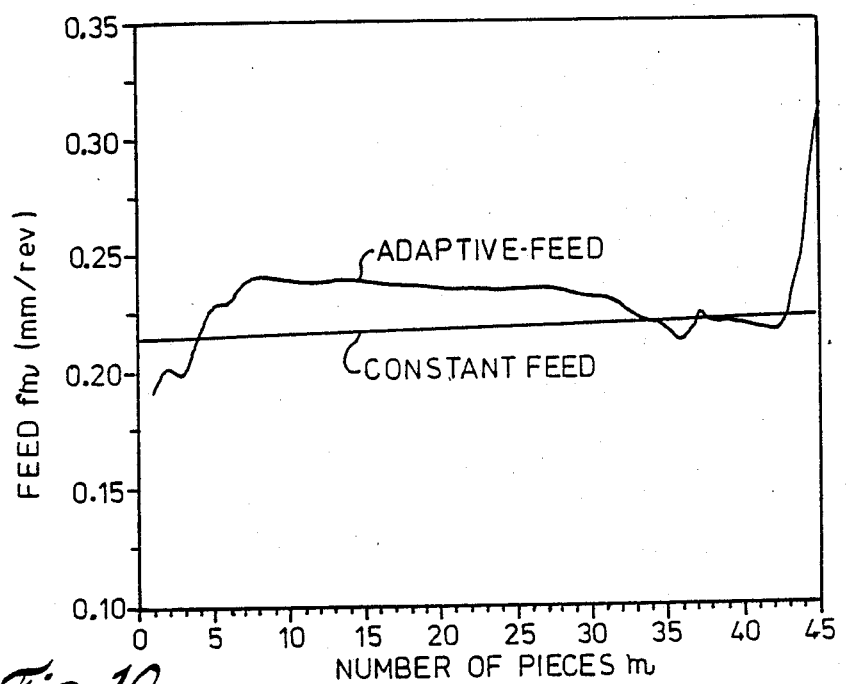
FIG. 10 is a graphical illustration of machining feed as a function of the number of pieces machined for the process recorded in FIG. 8.

FIG. 10 shows machining feed plotted against the workpiece number. The feed is initially raised in the break-in region to achieve the desired surface roughness, held essentially constant within the steady-state region while roughness does not significantly change, and lowered in the wear-out region to compensate for increasing tool wear. It is rapidly raised when the terminal region is reached attempting to offset the breakage of the tool nose. Machining carried out at a constant feed rate would appear as that shown in FIG. 10; it is apparent a higher average feed is used in the adaptive control.

Figure 11:
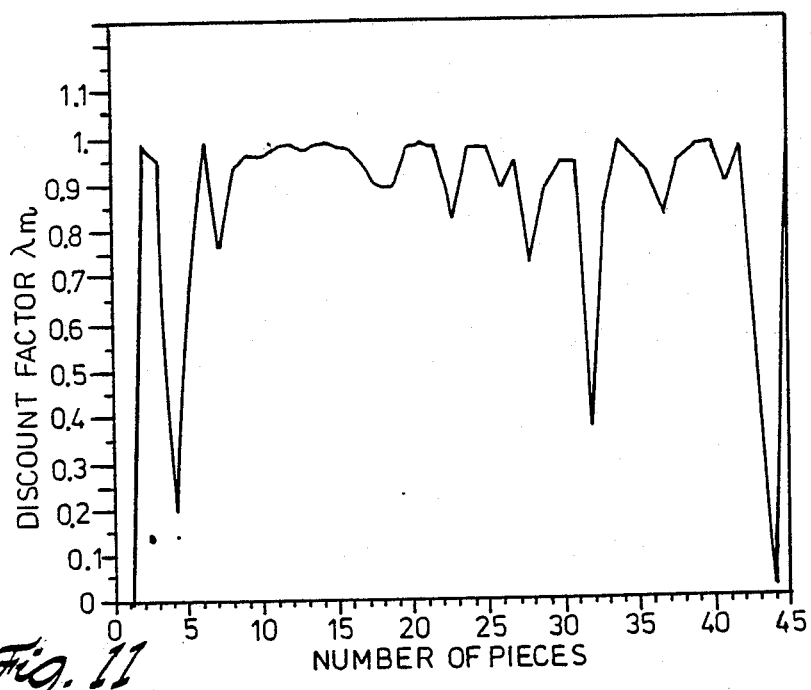
FIG. 11 is a graphical illustration of the forgetting factor plotted as a function of number of pieces machined for the process carried out in FIG. 8.

FIG. 11 illustrates the variation of the discount factor $\lambda_n$ used in surface roughness model; it is plotted against the workpiece number. The discount factor is close to 1 in the steady-state and wear-out regions where the model parameters are nearly constant or slowly changing. In the break-in and terminal regions, and at the transition between the steady-state and wear-out regions, the discount factor is lowered to adjust the changing model parameters.

Figure 12:
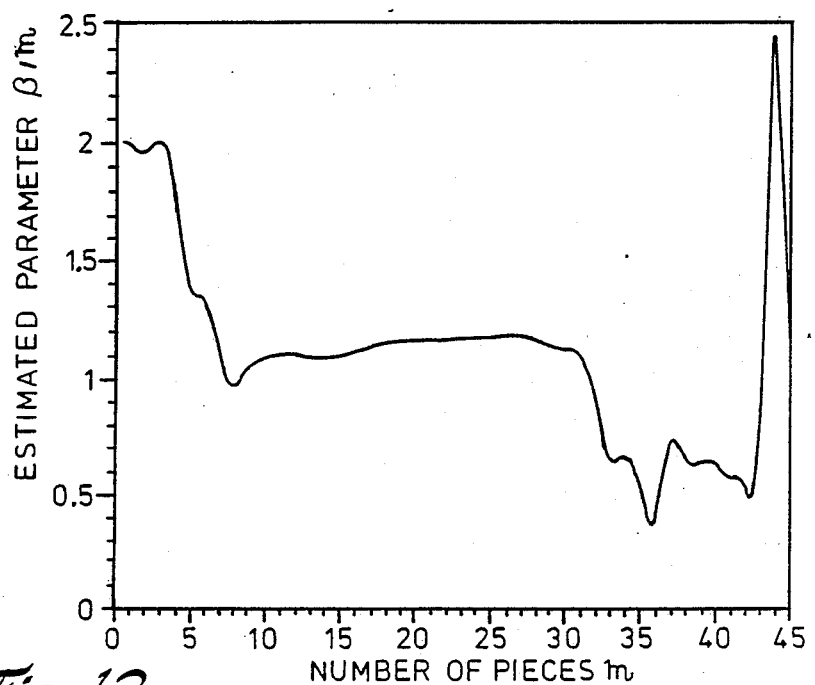
FIG. 12 is a graphical illustration depicting $\beta_1$ (the first coefficient of the vector matrix-form of the linearized algorithm) as a function of number of pieces machined for the test carried out in FIG. 8.

FIG. 12 is a graphical illustration of the estimated coefficient $\beta_{1n}$ plotted against workpiece number to illustrate the adjustments made in the break-in, steady-state, wear-out, and terminal regions. The estimate for $\beta_1$ is limited from below to prevent it from becoming negative. When this lower limit is reached, the control software generates a signal which can be used as an indication that the tool is worn out and should be replaced. By estimating the rate of change of surface roughness with respect to feed, it can be observed that when the rate of change is greater than what is normally taking place in the principal regions, it signals the approach of the final wear-out region. This provides a signal to change the tool based upon the rate of change of roughness with respect to feed. As a subfeature of this invention, it has been discovered that when $\beta_1$ (the coefficient for the first term of the initialized linearized model) becomes zero or is a negative number, the tool should be withdrawn.

Figure 13:
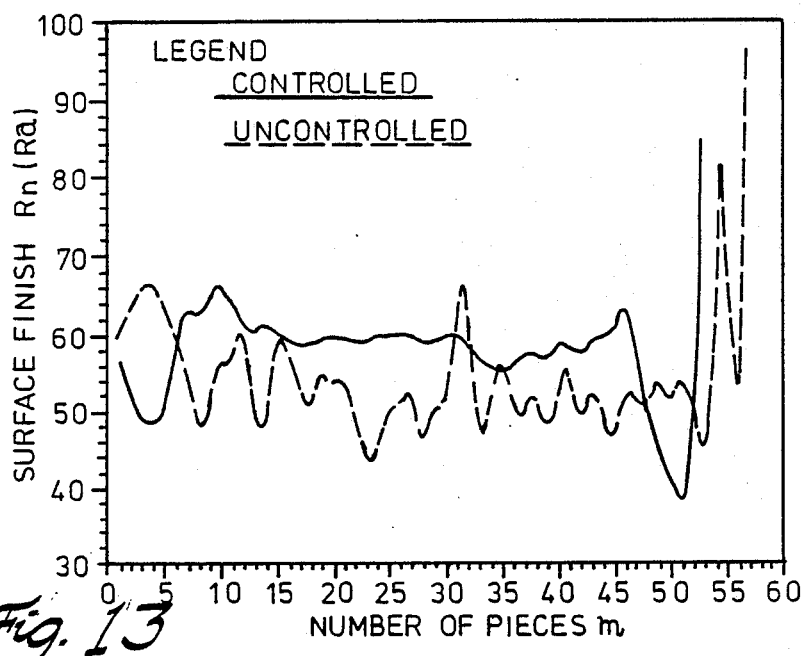
FIG. 13 is a graphical illustration and comparison of surface finish as a function of number of pieces machined for a second test carried out for the method herein and illustrating controlled versus uncontrolled (i.e., constant) feed.

Another test was undertaken, the results of which are presented in FIG. 13 and Table I. FIG. 13 is of interest because it compares the same test program using the same tool and material as previously described, but one graphical plot is for the adaptive controlled surface roughness and the other is for uncontrolled surface roughness according to prior art techniques where the feed is held generally constant. An average surface finish much closer to the desired value is obtained with the controlled technique as opposed to the uncontrolled technique. The actual computer data printout for the test of FIG. 13, using the algorithm steps of FIGS. 5 and 6, is illustrated in Table I.

These tests demonstrate that the primary effect of the adaptive feed controller disclosed herein is to find the feed value which keeps surface roughness at its desired value. This proper value of feed is very difficult to find manually, except by trial and error, because of the unknown effects of the tool and workpiece combination on the measured surface roughness.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the invention.

TABLE I

| Workpiece Number $n$ | Forgetting Factor $\lambda_n$ | Standard Deviation $\sigma_n$ | Estimated Parameters $\beta_{1n}$ | Estimated Parameters $\beta_{2n}$ | Desired Feed $f_R$ | Controlled Feed $f_n$ | Measured Roughness $R_n$ |
|---|---|---|---|---|---|---|---|
| 1 | 0.0000 | 10.0 | $2.0000e+00$ | $-1.0000e+00$ | $1.9420e-01$ | 0.1778 | 57.0 |
| 2 | 0.9914 | 10.0 | $2.0654e+00$ | $-9.3461e-01$ | $1.8316e-01$ | 0.1832 | 53.0 |
| 3 | 0.7869 | 7.5 | $1.9975e+00$ | $-9.4334e-01$ | $1.9016e-01$ | 0.1902 | 48.0 |
| 4 | 0.4216 | 7.6 | $1.7437e+00$ | $-8.1469e-01$ | $2.0471e-01$ | 0.2047 | 51.0 |
| 5 | 0.6751 | 6.8 | $1.3252e+00$ | $-4.3997e-01$ | $2.1909e-01$ | 0.2191 | 47.0 |
| 6 | 0.5064 | 6.9 | $5.1464e-01$ | $3.7585e-01$ | $2.8231e-01$ | 0.2572 | 60.0 |
| 7 | 0.9737 | 5.7 | $6.9277e-01$ | $1.7660e-01$ | $2.6086e-01$ | 0.2609 | 65.0 |
| 8 | 0.8773 | 5.2 | $8.4351e-01$ | $6.0632e-03$ | $2.5019e-01$ | 0.2502 | 61.0 |
| 9 | 0.9927 | 4.6 | $8.5723e-01$ | $-7.9358e-03$ | $2.4909e-01$ | 0.2491 | 64.0 |
| 10 | 0.8765 | 4.4 | $9.0163e-01$ | $-5.1985e-02$ | $2.4551e-01$ | 0.2455 | 69.0 |
| 11 | 0.4482 | 5.5 | $9.9880e-01$ | $-1.2913e-01$ | $2.3536e-01$ | 0.2354 | 63.0 |
| 12 | 0.9334 | 5.0 | $9.6549e-01$ | $-6.9518e-02$ | $2.3250e-01$ | 0.2325 | 63.0 |
| 13 | 0.9310 | 4.6 | $9.1994e-01$ | $3.9832e-03$ | $2.2981e-01$ | 0.2298 | 59.0 |
| 14 | 0.9921 | 4.2 | $9.3779e-01$ | $-2.3245e-02$ | $2.3059e-01$ | 0.2306 | 63.0 |
| 15 | 0.9261 | 4.0 | $8.9572e-01$ | $4.1980e-02$ | $2.2848e-01$ | 0.2285 | 60.0 |
| 16 | 1.0000 | 3.7 | $8.9572e-01$ | $4.1980e-02$ | $2.2848e-01$ | 0.2285 | 60.0 |
| 17 | 1.0000 | 3.5 | $8.9572e-01$ | $4.1980e-02$ | $2.2848e-01$ | 0.2285 | 59.0 |
| 18 | 0.9913 | 3.3 | $9.0820e-01$ | $2.3442e-02$ | $2.2897e-01$ | 0.2290 | 59.0 |
| 19 | 0.9911 | 3.1 | $9.1830e-01$ | $8.2529e-03$ | $2.2939e-01$ | 0.2294 | 60.0 |
| 20 | 1.0000 | 3.0 | $9.1830e-01$ | $8.2592e-03$ | $2.2939e-01$ | 0.2294 | 59.0 |
| 21 | 0.9909 | 2.9 | $9.2579e-01$ | $-3.1906e-03$ | $2.2973e-01$ | 0.2297 | 60.0 |
| 22 | 1.0000 | 2.8 | $9.2579e-01$ | $-3.1906e-03$ | $2.2973e-01$ | 0.2297 | 59.0 |
| 23 | 0.9908 | 2.7 | $9.3149e-01$ | $-1.2048e-02$ | $2.3002e-01$ | 0.2300 | 59.0 |
| 24 | 0.9907 | 2.6 | $9.3616e-01$ | $-1.9483e-02$ | $2.3028e-01$ | 0.2303 | 61.0 |
| 25 | 0.9907 | 2.5 | $9.3238e-01$ | $-1.3293e-02$ | $2.3003e-01$ | 0.2300 | 59.0 |
| 26 | 0.9906 | 2.5 | $9.3656e-01$ | $-1.9931e-02$ | $2.3027e-01$ | 0.2303 | 61.0 |
| 27 | 0.9906 | 2.4 | $9.3317e-01$ | $-1.4371e-02$ | $2.3004e-01$ | 0.2300 | 60.0 |
| 28 | 1.000 | 2.3 | $9.3317e-01$ | $-1.4371e-02$ | $2.3004e-01$ | 0.2300 | 59.0 |
| 29 | 0.9905 | 2.3 | $9.3674e-01$ | $-2.0064e-02$ | $2.3025e-01$ | 0.2302 | 59.0 |
| 30 | 0.9905 | 2.2 | $9.3967e-01$ | $-2.4863e-02$ | $2.3044e-01$ | 0.2304 | 60.0 |
| 31 | 1.0000 | 2.2 | $9.3967e-01$ | $-2.4863e-02$ | $2.3044e-01$ | 0.2304 | 60.0 |
| 32 | 1.0000 | 2.1 | $9.3967e-01$ | $-2.4863e-02$ | $2.3044e-01$ | 0.2304 | 59.0 |
| 33 | 0.9904 | 2.1 | $9.4179e-01$ | $-2.8495e-02$ | $2.3060e-01$ | 0.2306 | 55.0 |
| 34 | 0.7637 | 2.3 | $9.5219e-01$ | $-4.7423e-02$ | $2.3162e-01$ | 0.2316 | 57.0 |
| 35 | 0.9151 | 2.4 | $9.4775e-01$ | $-4.4982e-02$ | $2.3225e-01$ | 0.2322 | 54.0 |
| 36 | 0.6684 | 2.8 | $9.1579e-01$ | $-1.2635e-02$ | $2.3407e-01$ | 0.2341 | 56.0 |
| 37 | 0.8552 | 2.9 | $8.4953e-01$ | $6.7051e-02$ | $2.3565e-01$ | 0.2357 | 58.0 |
| 38 | 0.9642 | 2.8 | $7.9970e-01$ | $1.2889e-01$ | $2.3659e-01$ | 0.2366 | 59.0 |
| 39 | 0.9911 | 2.7 | $7.7174e-01$ | $1.6393e-01$ | $2.3708e-01$ | 0.2371 | 54.0 |
| 40 | 0.6920 | 3.1 | $5.4085e-01$ | $4.5457e-01$ | $2.4275e-01$ | 0.2428 | 62.0 |
| 41 | 0.9705 | 3.0 | $6.7444e-01$ | $2.8265e-01$ | $2.3999e-01$ | 0.2400 | 58.0 |
| 42 | 0.9661 | 2.9 | $5.9269e-01$ | $3.8691e-01$ | $2.4182e-01$ | 0.2418 | 56.0 |
| 43 | 0.8702 | 3.0 | $3.9252e-01$ | $6.4415e-01$ | $2.4861e-01$ | 0.2486 | 61.0 |
| 44 | 0.9932 | 2.9 | $4.5976e-01$ | $5.5655e-01$ | $2.4613e-01$ | 0.2461 | 60.0 |
| 45 | 1.0002 | 2.8 | $4.5976e-01$ | $5.5655e-01$ | $2.4613e-01$ | 0.2461 | 59.0 |
| 46 | 0.9916 | 2.7 | $4.2290e-01$ | $6.0435e-01$ | $2.4748e-01$ | 0.2475 | 65.0 |
| 47 | 0.7986 | 2.9 | $6.3777e-01$ | $3.2461e-01$ | $2.4209e-01$ | 0.2421 | 62.0 |
| 48 | 0.9638 | 2.8 | $6.7135e-01$ | $2.8269e-01$ | $2.4109e-01$ | 0.2411 | 47.0 |
| 49 | 0.0995 | 6.6 | $-1.6566e-01$ | $1.2969e+00$ | $2.4109e-01$ | 0.2411 | 45.0 |
| 50 | 0.5641 | 6.6 | $-7.2298e-01$ | $1.9722e+00$ | $2.4109e-01$ | 0.2411 | 42.0 |
| 51 | 0.6369 | 6.4 | $-1.1745e-00$ | $2.5193e+00$ | $2.4109e-01$ | 0.2411 | 44.0 |
| 52 | 0.9527 | 5.5 | $-1.2837e+00$ | $2.6515e+00$ | $2.4109e-01$ | 0.2411 | 34.0 |
| 53 | 0.3030 | 7.1 | $-2.0989e+00$ | $3.6393e+00$ | $2.4109e-01$ | 0.2411 | 91.0 |
| 54 | 0.0195 | 9.8 | $4.6793e+00$ | $-4.5737e+00$ | $2.1912e-01$ | 0.2191 | 55.0 |
| 55 | 0.9999 | 7.0 | $5.4835e+00$ | $-5.6641e+00$ | $2.2234e-01$ | 0.2223 | 57.0 |
| 56 | 0.9497 | 5.8 | $5.6859e+00$ | $-5.9434e+00$ | $2.2316e-01$ | 0.2232 | 55.0 |
| 57 | 0.8327 | 5.4 | $5.9144e+00$ | $-6.2632e+00$ | $2.2415e-01$ | 0.2441 | 57.0 |
| 58 | 0.9324 | 4.9 | $5.9901e+00$ | $-6.3735e+00$ | $2.2459e-01$ | 0.2246 | 58.0 |

What is claimed is:

1. A method of adaptively controlling feed for a cutting tool to improve the surface finish of a series of machined workpieces, comprising:
   (a) sensing surface finish and feed information from the first of said workpieces which is undergoing or has undergone surface machining;
   (b) recursively estimating a feed that would produce a desired surface finish solely as a function of surface roughness;
   (c) using said estimated feed to machine the next of said series of workpieces; and
   (d) repeating steps (a)–(c) for each successive workpiece.

2. The method as in claim 1, in which in step (b) said function is a geometrical model of surface roughness and step (b) is carried out by:
   (i) linearizing said geometrical model;
   (ii) initializing said model; and
   (iii) subjecting the initialized model to computerized estimation based on roughness and feed values taken from the last machined workpiece, thereby to determine the largest allowable feed for attaining a desired surface roughness in subsequently machined workpieces or segments of the series.

3. The method as in claim 2, in which said geometrical model has the form $R = 1262.79 \, f^2/r$.

4. The method as in claim 2, in which said linearized model has the form:

$$R = \alpha R(f_o) + [dR(f_o)/df](f - f_o).$$

5. The method as in claim 2, in which said initialized model has the form $R = \beta_1(s_R f) + \beta_2 R_{max}$.

6. The method as in claim 3, in which said model is initialized by (i) setting R equal to $R_{max}$ (desired roughness) and solving for the initial feed, and (ii) placing the initialized feed in the linearized model to complete initialization.

7. The method as in claim 6, in which the initial feed is $0.0281406 \sqrt{r R_{max}}$.

8. The method as in claim 6, in which linearizing and initializing are carried out by (i) linearizing the static mathematical model using Taylor series expansion techniques, and (ii) substituting the initialized feed in such linearized expression to provide a mathematical model of the form $R = \beta_1 s_R f + \beta_2 R_{max}$ where R is the measured or updated roughness, $\beta_1$ and $\beta_2$ are estimated coefficients, $s_R$ is a scale factor chosen to make the term $s_R f$ in the expression have the same order of magnitude as R, f is feed, and $R_{max}$ is the desired roughness.

9. The method as in claim 8, in which $s = 35.53804 \sqrt{R_{max}/r}$.

10. The method as in claim 2, in which computerized estimation of step (c) is carried out by (i) converting said linearized model to vector-matrix notation, (ii) inserting measured roughness and feed values taken from the last machined workpiece or segment into such vector model, and (iii) recursively estimating $\beta_1$ and $\beta_2$ by sequential regression analysis to provide an updated solution for feed.

11. The method as in claim 10, in which the converted form of the linearized mathematical model is $R_n = \theta^T x_n$, where $R_n$ is measured roughness, $\theta$ is the parameter vector of the coefficients $\beta_1$ and $\beta_2$, and $x_n$ is the computed vector of $s_R f$ and $R_{max}$.

12. The method as in claim 10, in which recursive estimation is carried out, after inserting measured roughness and feed values to constitute the vector $x_n$, by using sequential regression analysis to update the least squares estimates of $\theta$ in the equation: $\theta_n \theta_{n-1} + k_n \epsilon_{n-1}$, where $\theta_{n-1}$ is computed from the immediately preceding workpiece or segment, $k_n$ is an estimation gain vector, and $\epsilon_n$ is a current prediction error vector.

13. The method as in claim 12, in which $k_n$ is equal to $P_{n-1} x_n / (x_n^T P_{n-1} x_n + \lambda_n)$, where $P_{n-1}$ is the covariance matrix of regression errors known from the previous workpiece, $x_n$ is the computed vector of $s_R f$ from the previous workpiece and $R_{max}$, and $\lambda_n$ is the discount or forgetting factor derived from theory.

14. The method as in claim 10, in which $\epsilon_n = R_n - \hat{}_n$, where $R_n$ is the measured roughness and $\hat{}_n$ is the predicted roughness given by $\hat{}_n = \theta_{n-1}^T x_n$.

15. The method as in claim 13, in which the covariance matrix of parameter estimation errors can be updated by use of the following equation: $P_n = (I - k_n^T x_n) P_{n-1} / \lambda_n$, where I is the identity matrix, and the other terms are as defined in claim 12.

16. The method as in claim 12, in which recursive estimation can be improved by modifying $k_n$ to have a square root algorithm taking the form $k_n = g_n/(|v_n|^2 + \lambda_n)$, where $g_n$ is $S_{n-1} v_n$, $v_n$ is $S_{n-1}^T x_n$, $\lambda_n$ is a theoretically derived discount factor, and $S_n$ is a matrix which is the square root of $P_n$.

17. The method as in claim 16, in which $\lambda_n$ is chosen to keep $\Sigma_n$ equal to a desired experimentally derived value in the algorithm:

$$\Sigma_n = \sum_{k=1}^{n} \lambda_n^{n-k} (y_k - \theta_n^T x_k)^2.$$

18. The method as in claim 16, in which $$S_n = \{S_{n-1} - g_n v_n^T / [|v_n|^2 + \lambda_n + 1 \sqrt{\lambda_n(|v_n|^2 + \lambda_n)}]\} / \sqrt{\lambda_n}.$$

19. The method as in claim 5, in which $\beta_1$ is monitored as a predictor of tool failure so that when $\beta_1$ equals zero or becomes negative, a message is transmitted to replace the cutting tool.

20. The method as in claim 11, in which the accuracy of estimating $\theta$ is improved by incorporating a forgetting factor $\lambda_n$ chosen to minimize and keep constant the discounted sum of squared model errors $\Sigma_n$.

21. The method as in claim 20, in which $$\lambda_n = \sqrt{|v_n|^2 + c_n} - c_n, \text{ where } c_n = (\epsilon_n^2 / \Sigma_o + |v_N|^2 - 1)/2$$

22. The method as in claim 2, in which said largest allowable feed f is derived by using the largest recursively estimated feed which meets all of the following constraints: (i) resides between user determined minimum and maximum feeds, (ii) provides a feed which does not cause the feed rate to exceed a user determined maximum feed rate, (iii) provides a slenderness ratio which is between user determined minimum and maximum values for such slenderness ratio, (iv) provides that the cutting speed v satisfy the relationship $v \geq c/f$, where c is a built-up edge threshold value, and (v) constrains the feed to be within a prescribed distance from the currently used feed value.

23. A method of using artificial intelligence to obtain adaptive roughness control feed for improving the surface finish of a series of machined workpieces and/or a series of segments on a single workpiece, comprising:
(a) initializing a linear computer model of surface roughness as a function of feed by (i) approximating a geometric relationship of centerline average roughness in terms of feed, (ii) estimating an initial feed and linearizing said relationship about such feed estimate, and (iii) converting such linearized model to vector matrix notation with provision for estimated coefficients;
(b) interacting (i) measured feed and surface roughness values taken from an external interface with the immediately preceding workpiece or segment in said series, with (ii) estimated coefficient values for said initialized model by use of sequential regression analysis to provide an updated computer model; and
(c) solving for the largest allowable feed in the updated model within selected machining parameter constraints for the next workpiece or segment in the series
(d) using said largest allowable feed to machine the next sequential workpiece or segment.

24. The method as in claim 23, in which said selected machining parameter constraints are equivalent to a pair of inequalities $f_l \leq f \leq f_u$, where $f_l = \max(f_{min}, d/s_{max}, c_{bue}/v, f_p - \Delta)$, and $f_u = \min(f_{max}, F_{max}, F_{max}/N, d/s_{min}, f_p + \Delta)$.

* * * * *